United States Patent [19]

Graton et al.

[11] Patent Number: 4,908,004
[45] Date of Patent: Mar. 13, 1990

[54] TORSION DAMPING DEVICE WITH MOVEMENT TRANSMITTING ELEMENT

[75] Inventors: Michel Graton; Michel-Andre Courcol, both of Paris; Jacques Thiebaut, Chanteloup-les-Vignes, all of France

[73] Assignee: VALEO, Paris, France

[21] Appl. No.: 176,290

[22] Filed: Mar. 31, 1988

[30] Foreign Application Priority Data

Apr. 2, 1987 [FR] France ............................. 87 04614
Aug. 3, 1987 [FR] France ............................. 87 10991

[51] Int. Cl.⁴ .................... F16D 13/68; F16F 15/12
[52] U.S. Cl. ................................ 464/68; 192/105 BA; 192/106.2; 464/64
[58] Field of Search .......... 192/103 B, 105 BA, 106.2; 464/64, 66, 67, 68

[56] References Cited

U.S. PATENT DOCUMENTS

| 2,762,483 | 9/1956 | Clark | 192/105 BA |
| 3,971,462 | 7/1976 | Johansson | 192/105 BA |
| 4,698,045 | 10/1987 | Billet et al. | 464/68 |

Primary Examiner—Daniel P. Stodola
Attorney, Agent, or Firm—Charles E. Brown; Charles A. Brown

[57] ABSTRACT

A torsion damping device in a clutch plate is fitted with an interposing element comprising two movable centrifugal plates. According to the invention, the two movable plates are connected to one another by at least one transmission element which is rotatable relative to the plates in such a way that a radial displacement of one of the movable plates causes rotation of the transmission element and a radial displacement in the opposite direction of the other movable plate.

14 Claims, 14 Drawing Sheets

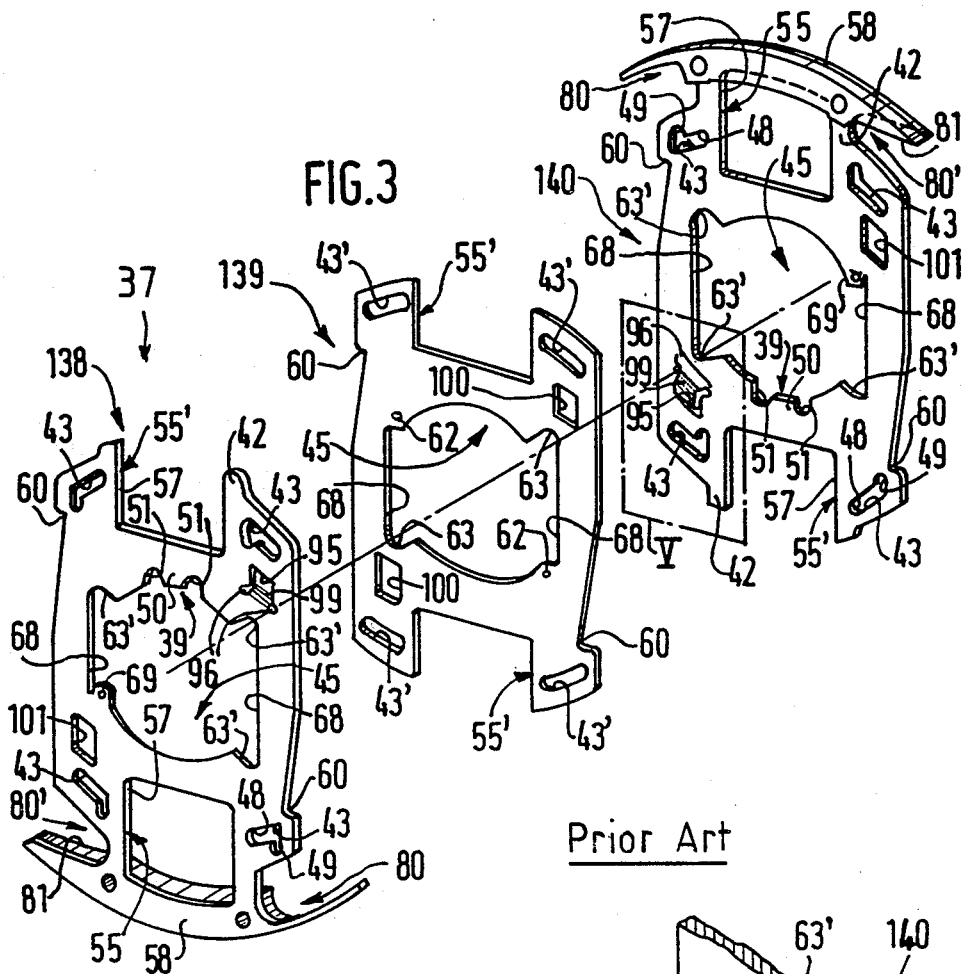
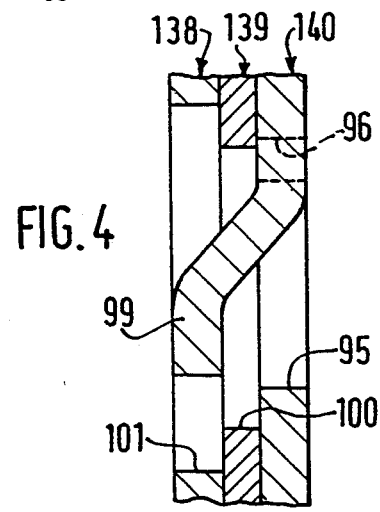
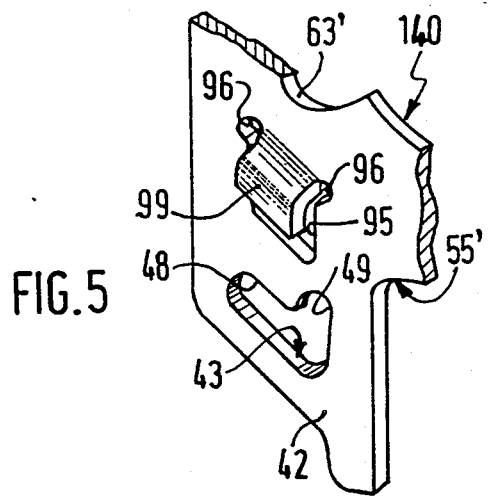
FIG. 3
FIG. 4
FIG. 5 — Prior Art

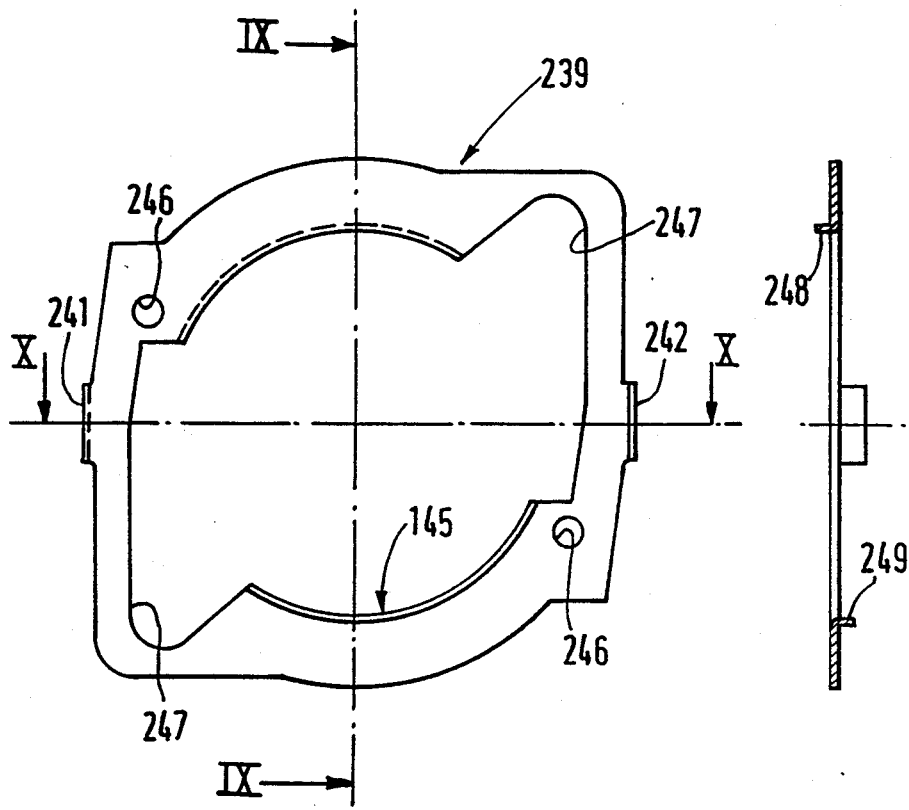
FIG.8
FIG.9
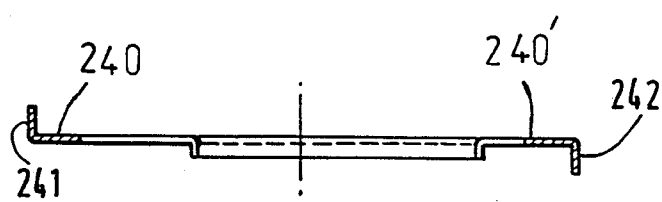
FIG.10

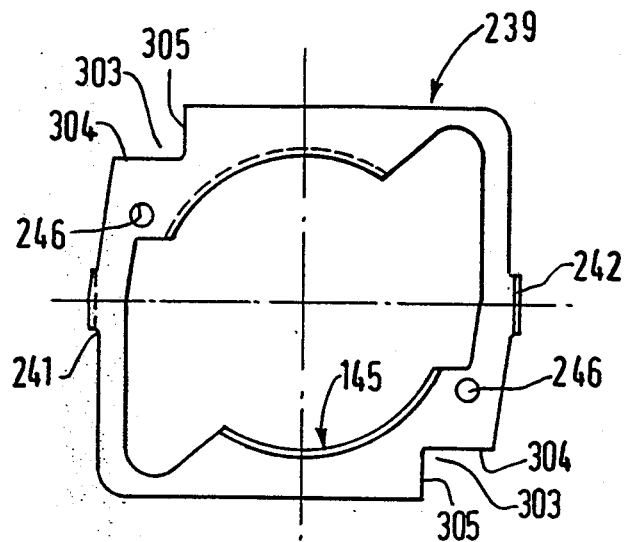
FIG. 18
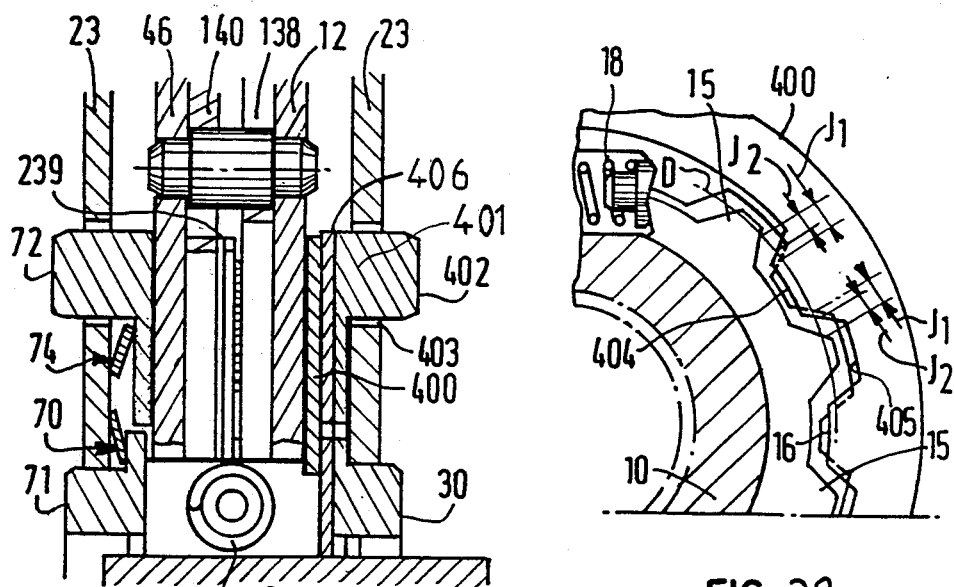
FIG. 27
FIG. 28

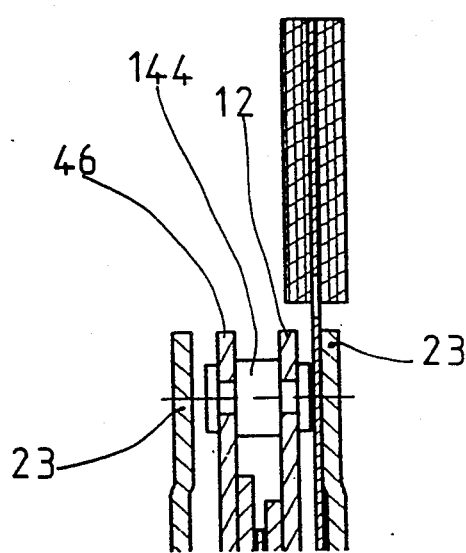
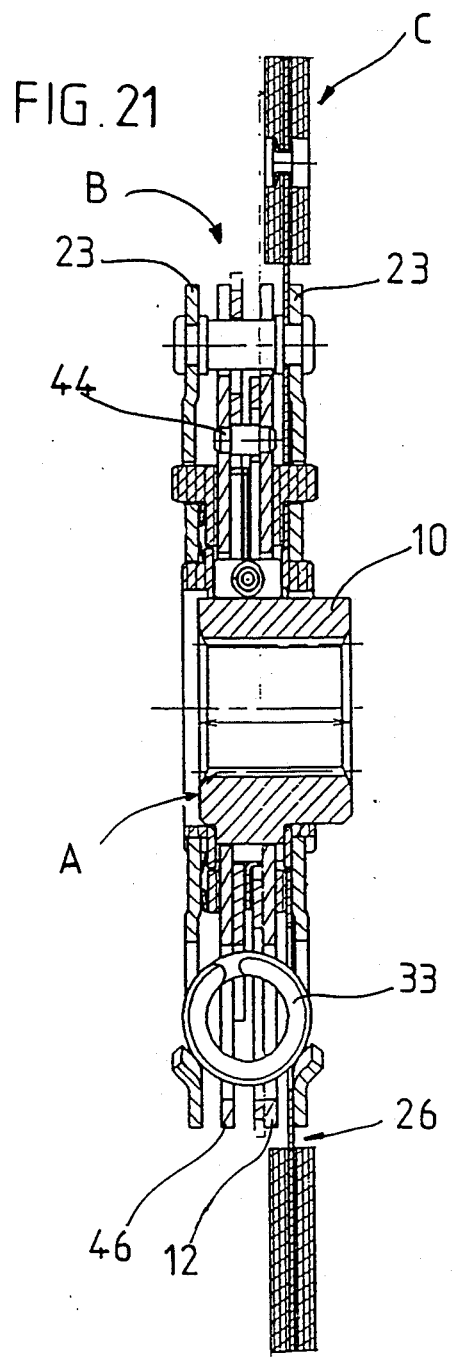
FIG. 20
FIG. 21

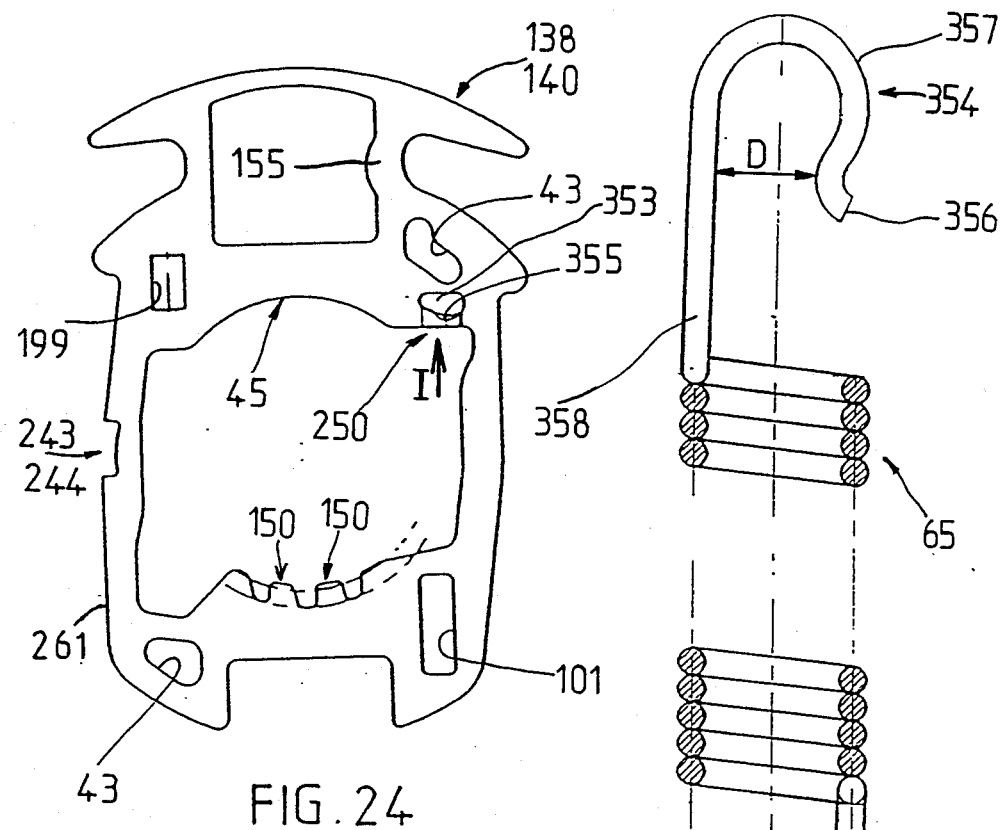
FIG. 25
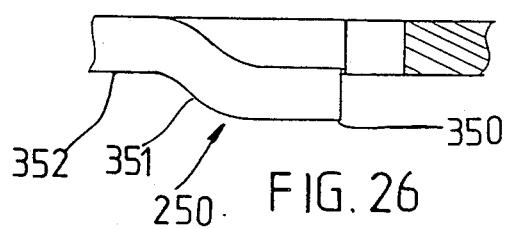
FIG. 24
FIG. 26

TORSION DAMPING DEVICE WITH MOVEMENT TRANSMITTING ELEMENT

BACKGROUND OF THE INVENTION

1. Field of the Invention

The present invention relates generally to torsion damping devices, especially to those incorporated into the friction disc of a friction clutch for an automobile vehicle, of the kind comprising at-least three coaxial parts mounted for relative angular movement with respect to one another within the limits of a defined sector of angular movement against the action of elastic means, namely a first part comprising a hub, a second part comprising a hub flange, with means for meshing with the hub with some play, and a third part comprising at least one transverse annular flange which encircles the hub but which is independent of it.

2. Description of the Related Art

French Patent Application No. 2 566 497 and its addition No. 2 582 765 U.S. Pat. No. 4,698,045 describe friction discs of this kind fitted with an interposing element in the form of two movable diametrically opposed plates each comprising a set of teeth by which they engage a complementary set of teeth on the hub.

At low coupling values, when the interposing element is in service, the weak elastic means disposed between the hub and the hub flange are thereby prevented from acting alone.

French Patent Application No. 2 582 765 describes a device with a radially fixed intermediate plate interposed between the movable plates. An elastic means connects one of the movable plates to the intermediate plate, whilst another elastic means connects the other movable plate to the intermediate plate. Guiding means are provided to guide the radial displacement of the movable plates.

This construction allows the radial displacement of the two plates to be synchronised, but can present disadvantages. For example, due to seizure one of the plates may remain wedged whilst the other moves. Similarly, one of the elastic means can break in such a way that one of the plates may move before the other.

In all these cases one of the plates may not become engaged with the hub resulting in a poor functioning of the torsion damper or even breakage of the elements.

The object of the present invention is to alleviate these disadvantages and to create a device which synchronizes the radial displacement of the plates in all circumstances.

SUMMARY OF THE INVENTION

According to the invention, a torsion damping device of the kind described above is characterized in that the two movable plates are connected to one another by at least one transmission element capable of rotary movement relative to them, in such a way that a radial displacement of one of the movable plates causes rotation of the transmission element and a corresponding radial displacement in the opposite direction of the other plate.

Thus resulting from a displacement of the transmission element relative to the movable plates the displacement of one of the plates automatically entrains the displacement of the other plate in all circumstances, so that the transmission element acted on by one of the plates constitutes an actuator for the other plate.

In one embodiment, the rotatable transmission element is radially fixed and is mounted to rotate relative to the movable plates around the axis of the assembly.

The transmission element can be centered directly and radially fixed by the set of teeth on the hub, for example by axial returns pointing in opposite directions to one another.

According to another embodiment, entrainment means are provided between the transmission element and each of the movable plates. With this arrangement, the transmission element can be situated either between the two movable plates or outside them.

The entrainment means may comprise two lugs extending from the transmission element and engaged in openings formed in the movable plates, or vice versa. The openings may be notches formed laterally in the edge of the movable plates. In that case, to perfect the synchronization of the displacements of the plates and to reduce the play, preferably the bottom of the opening is cut to form an application section in the junction zone.

Between each of the movable plates and the transmission element are interposed elastic return means to control operation of the movable plates at a chosen speed. In contrast to the arrangement in prior art, only two slots are made per movable plate.

Bent-out lugs are formed in the region comprising the notches by which the movable plate engages the small connecting pillars. Preferably, these bent-out lugs are made by cutting the lateral edges of these, then shaping them locally. These arrangements allow a very robust lug to be obtained, as well as precise guiding thanks to the cuts which form the lateral edges.

Consequently, the window of the other movable plate for guiding the bent-out lug is made in the lower part of the plate, diametrically opPosite the lug.

Preferably to strengthen the movable plate and for maximum conservation of material, the bent-out lug extends transversely. The transmission element can then be mounted only in one direction.

All these arrangements, reinforced by the presence of the transmission element, make it unnecessary for the movable plate to carry a flyweight. Of course, material can be added in the radial edge of the plate window, close to the bottom of its notch, for better mechanical behaviour of the plate.

BRIEF DESCRIPTION OF THE DRAWINGS

FIG. 3 is a perspective view of two movable plates and the interposing element of the prior art;

FIG. 4 is a cut along the line VI—VI of a part of the interposing element shown in FIG. 1;

FIG. 5 is an enlarged view of the detail in box V of FIG. 3;

FIG. 8 is a front view of the transmission element of FIG. 7;

FIG. 9 is a view in section along the line IX—IX of FIG. 8;

FIG. 10 is a view in section along the line X—X of FIG. 9;

FIG. 18 is a view in elevation of the transmission element similar to view 8 of another embodiment;

FIG. 20 is a partial view along the line B—B of FIG. 19;

FIG. 21 is a partial view along the line A—A of FIG. 19;

FIG. 24 is a view in elevation of a movable plate of this variant;

FIG. 25 is a simplified view of the return spring of this variant;

FIG. 26 is a view in enlarged detail along the arrow I of FIG. 24;

FIG. 27 is a partial view in axial section of the damper similar to view 22 of another embodiment; and FIG. 28 shows a partial view of the washer meshing with the hub of this variant.

DESCRIPTION OF THE PREFERRED EMBODIMENT

Figure 1:
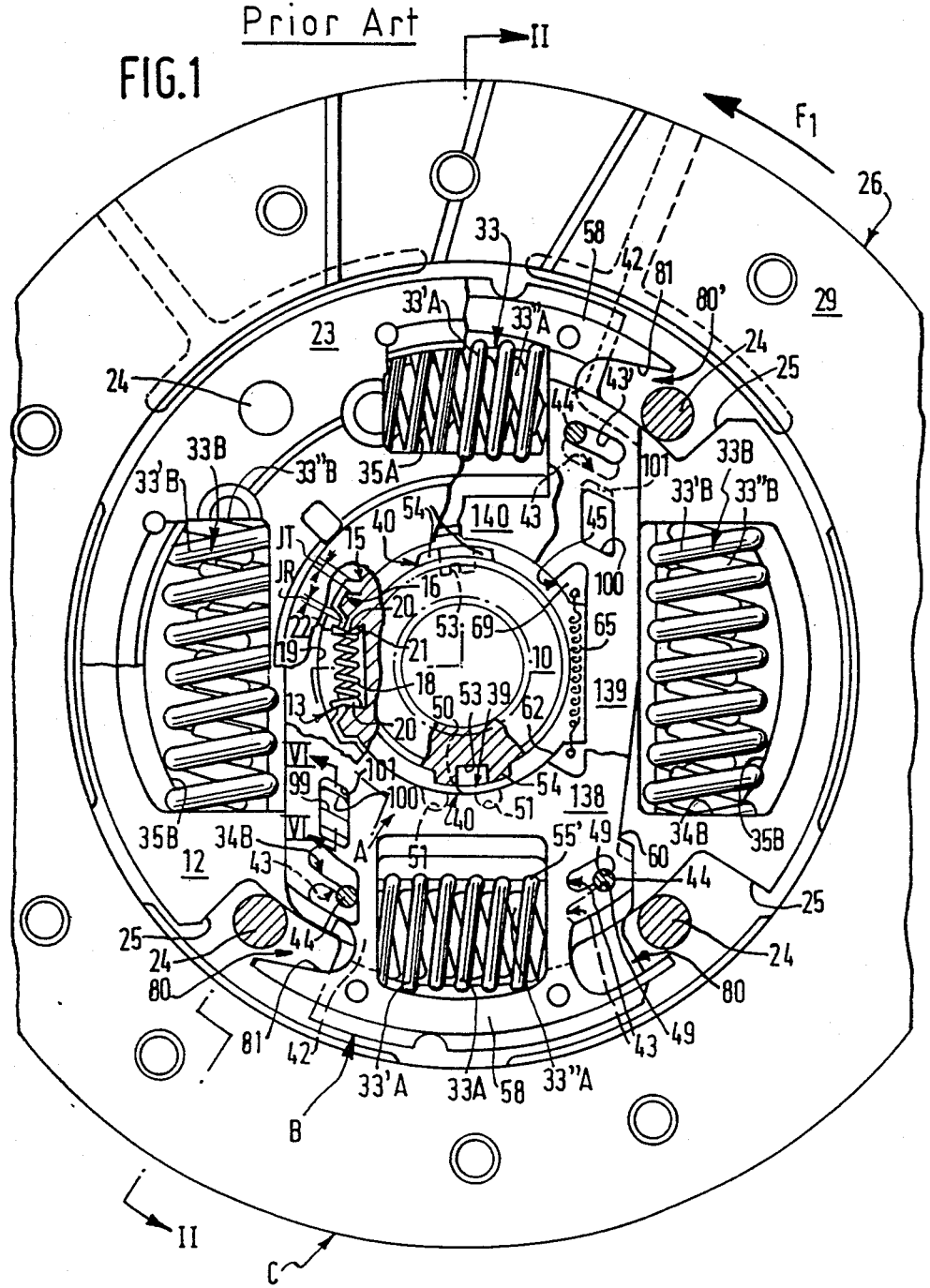
FIG. 1 shows a view in front elevation, partially cut away, of a device according to French patent application No. 2 582 765.

These Figures show the application of the invention to a clutch friction disc of the kind described in French patent application No. 2 582 765.

The friction disc comprises three coaxial parts A, B, C, mounted for relative angular movement with respect to one another, within the limits of a chosen sector.

Part A comprises a hub 10, and part B comprises a hub flange 12, which forms an annular piece encircling the hub 10. Between flange 12 and the hub 10 are located meshing means 13 for inter-engagement of the flange 12 and hub 10.

Part C comprises, transversely around the hub, at least one annular flange 23 referred to as a guide washer. Flange 23 is movable independently of the hub, in other words it does not have meshing means with play.

Hub 10 is intended to be fixed in rotation, through the splines 11, with the input shaft of the gear box, whilst flange 23 is integral with a friction disc 26, comprising a flange 27 carrying two friction linings 29. Flange 23 is intended to be fixed in rotation, by clamping of the friction linings 29 between a pressure plate and a reaction plate (not shown), with the engine output shaft or flywheel.

It will be noted that the two flanges 23 are situated axially on either side of the flange 12. These flanges 23 are connected by small pillars 24 which extend through flange 12 with a clearance provided by notches 25, and which also fix the flange 27.

The meshing means 13 comprise, for hub 10, a set of teeth 15 and, for the hub flange 12, a set of teeth 16, of which the teeth are engageable with circumferential play (JT in the pulling direction, JR in the reverse direction) with the teeth in the set 15.

These sets of teeth 15–16 are formed respectively in the edge of internal periphery of flange 12 and in a small radial collar 14 on hub 10.

Elastic means with a circumferential action, here two relatively weak springs 18, are interposed between flange 12 and hub 10 (only one spring can be seen in FIG. 1). These springs 18, of the coiled spring kind, are each housed partly in a recess made in the set of teeth 15, and partly in a recess made in the set of teeth 16. 21 and 22 are respectively a shoulder of hub 10 and a shoulder of flange 12 for the application of a circumferential end of the spring 18 to peg 20.

Elastic means 33A, 33B, also with circumferential action, and comprising in this case coiled springs stronger than springs 18, are housed in windows 34A, 34B of flange 12 and 35A, 35B of the guide washers 23, and act between hub 10 and flange 12. In this case the windows are made to correspond with one another, having an identical circumferential opening. In a variation, the circumferential openings of some windows may be different to obtain staged intervention of the springs.

Between hub 10 and flange 12 is disposed an interposing element 37 which is responsive to centrifugal force and is mounted movably between a standby position, in which it is inoperative, and, when the rotation speed exceeds a pre-set value or critical speed, an operating position. In the operating position it intervenes between the two rotating parts, in at least one direction of rotation and drives in the direction of rotation at least part of the circumferentially-acting elastic means 33A, 33B, other than those 18 normally acting between them. The return means 65 are arranged to urge the said interposing element 37 in the direction of the standby position.

The interposing element comprises two similar movable plates 138, 140 which are mounted to be radially movable, and each of which comprise a set of teeth 39 by which they engage, in the operating position, with the complementary sets of teeth 40 provided for this purpose on hub 10. These movable plates also comprise at least one application lug 42 (FIG. 3) intended to allow them to act on at least a part of the elastic means 33A, 33B.

The plates 138, 140 are mounted diametrically opposite each other and are engaged by slots 43 on pillars 44 projecting axially from hub flange 12. Each of the slots has a straight section 49 and a curved section 48, elongated circularly, which is centred on the axis of the assembly.

An intermediate plate 139 is disposed between the two movable plates 138, 140 and is engaged, by the slots 43', on the pillars 44. Plates 140, 139, and 138 extend between the flange 12 and a counter-flange 46 connected to flange 12 by the pillars 44.

Counter-flange 46 has openings identical to the windows 34A of flange 12 to house the springs 33A, 33B.

Each of the said plates 138, 140 comprises diametrically opposite openings 55, 55', by which it is engaged with the springs 33A. The openings 55, 55' are superimposed, in plan, on the windows 34A of the flange 12 and counter-flange 46 with a small circumferential displacement, (as indicated by the arrow F1 in FIG. 1 corresponding to the normal direction of rotation) of the edge 57 of the opening opposite the other edge, to the rear, itself forming the application lug 42.

The intermediate plate 139 comprises two diametrically opposite notches 55'. Each plate 138, 140 carries a flyweight 58 and has two lateral notches 80, 80'. Notch 80' presents an outer side 81 oblique to the tangent to the circle passing the end of this side. The side 81 is intended to cooperate with a pillar 24 to facilitate the movement of the movable plate from its standby position to its operating position.

The plates 138, 139, 140 are held in contact with one another by the pressure of the axially-acting elastic means 64, in this case a Belleville washer, which engages the hub flange 12 and drives plate 140 towards flange 46.

Frictional means 72, balanced elastically by a washer 74, are provided between the guiding washer 23 and counter-flange 46. Similarly, frictional means 71, balanced elastically by a washer 70, are provided between the above mentioned washer 23 and the collar 14 of the hub.

The guiding washer 23, which supports the friction disc 26, is centered by a bearing-block 30, having a transverse flange 31, fixed in rotation with the guiding washer 23 by bosses engaged in slots formed in it.

Each plate 138, 140 is equipped with an attachment lug 69, whilst plate 139 has two diametrically opposite attachment lugs 62. These serve to attach the return means 65 which comprise coil springs. These sPrings 65 connect one lug 69 to one lug 62. They bring the plates 138, 140 from their operating position to their standby position and allow a radial separation of the movable plates beyond a set limit. Each plate 138, 140 has a bent-out lug 99 for radial guidance engaging in windows 100 of the intermediate plate 139 and 101 of the other plates 138, 140.

According to the invention, the intermediate plate 139 is omitted and the two movable plates 138, 140 are joined to one another by means of a movement transmission element 239 (FIG. 6) mounted for pivoting relative to these plates in such a way that displacement of one of the movable plates 138, 140 causes rotation of the transmission element and a radial displacement in the opposite direction of the other movable plate.

This transmission element is interposed between the two movable plates 138, 140. It thus replaces the intermediate plate 139 in the friction clutch of FIGS. 1 to 5, and for simplicity the same references as used in the said Figures will be reused for the same elements.

The pivoting transmission element 239 is fixed radially in relation to the axis of the assembly, by the edge of its central opening 145 engaging the periphery of the set of teeth 15 of hub 10. It has substantially the shape of a washer and carries in diametrically opposite positions two arms 240, 240', each equipped with a right angle return 241, 242. These returns 241, 242 point in opposite axial directions and are adapted to engage respectively in openings 243 of the movable plate 138 and 244 of the movable plate 140.

The openings 243, 244 consist here of two notches 243, 244 each formed in the edge of one of the lateral sides of the respective movable plate and are diametrically opposite each other. They have dimensions suitable for the returns 241, 242.

A pre-stressed return means 65 is provided between the pivoting transmission element 239 and each of the movable plates 138, 140. These comprise coil springs disposed parallel to the diametric plane of the assembly and each connects one attachment lug 69, of one of the movable plates 138, 140, to an attachment opening 246 provided on each of the arms 240, 240' for this purpose.

Together the right angle returns and notches form the means of entrainment. Any radial displacement of one of the plates 138, 140 causes rotation of the transmission element 239 and a radial displacement in the opposite direction of the other plate.

This element 239 is simplified in comparison with plate 139 in that it has no openings 55', slots 43' or windows 100. It is thus more durable.

In a variation, taking into account the existence of the returns 241, 242, the transmission element 239 may be disposed outside the two movable plates 138, 140. Preferably the element 239 is formed from a metallic plate by cutting and folding.

FIGS. 7 to 12 show another variant again with the movable plates 138, 140 diametrically opposed.

The symmetrically shaped element 239, has substantially the shape of a parallelogram with a central circular opening 145. The openings 246 are displaced radially relative to the returns 241, 242 to lengthen the springs 65, one being disposed near the upper left corner of the element 239, the other near bottom right corner (FIG. 8). The openings 246 are diametrically opposite one another. The central circular opening 145 is interrupted by clearances 247 for the springs 65 to pass through.

To hold it radially and to centre it with respect to the set of teeth 15, element 239 is formed centrally at the level of its opening 145, with two axial returns 248, 249 extending in opposite directions to increase its stability. The element 239 can be centred by the pillars 44, by giving the external periphery of the element 239 an annular shape (FIG. 8), for contact with the pillars.

To mount the other end of the spring 65, each plate 138, 140 presents an L-shaped lug 250 formed from a right angle return 251, the radial part of which is turned towards the centre of the plate. A clearance 253 is provided in each plate 138, 140 to allow easy mounting of the springs 65. The plates 138, 140 are made from a metal sheet by cutting and folding and each has only two diametrically opposite slots 43. Each slot comprises a curved section 48 which, elongated substantially circumferentially, is centred on the axis of the assembly, and a straight section 49 which, situated at one of the circumferential ends of section 48, extends substantially parallel to the plane of the assembly passing through the middle zone of the respective plate.

In the slot situated on the side opposite the set of teeth 39, the section 49 extends in a direction away from the teeth 39 relative to the curved section 48; for the other slot it extends on the same side as the teeth. The two curved sections 48 meet together in broadly rounded junction sections The set of teeth 39 is made by cutting the edge of the central opening 45 and is reduced to a single tooth 50, enclosed by two gaps 51. Correspondingly, the set of teeth 40 of hub 10 is reduced to a single axial groove 53 between two axial ridges 54 on the periphery of the collar 14 as illustrated in FIGS. 1-5.

Preferably the teeth of the complementary sets of teeth 39, 40 have slightly oblique sides, and rounded edges, to facilitate their mutual engagement as well as their subsequent disengagement.

The bent-out lugs 99 are formed in the radial part of the movable plate opposite to that presenting the set of teeth 39. A single bent-out lug is provided on each plate near the lower end of the opening 55, being disposed on the other side of the transverse plane of symmetry in relation to slot 43. This bent-out lug is thus associated with the part presenting the identical notches 80, 80′.

As a consequence, the window 101, provided for the bent-out lug of the other movable plate is disposed in a position diametrically opposite the bent-out lug 99.

It will be noted that edge 57 of opening 55′ has been cut short by the material having been removed.

All these arrangements favour a reduction in weight of the portion of the movable plate carrying the set of teeth 39 and an increase in weight of the portion in which the notches 80, 80′ are made.

These arrangements also permit freedom from the necessity of having a flyweight 58. As a precaution, more material is added in the substantially radial lateral edge of window 55 delimiting the lug 42. This additional material 155 (FIG. 11) gives to the said edge and to lug 42 a convex shape in its portion facing the base of the notch 80′ such that the thickness of material between the base and the radial edge is increased. Placing the pillar 24 in contact with the base of the notch 80′ therefore does not cause rapid wear of the plate 138, 140.

If necessary, rivets acting as flyweights can be added in the openings 252 provided near the notches 80, 80′. The bent-out lug 99, after cutting and shaping, locally forms a continuous deep ridge of convex shape which is therefore more durable than that of FIGS. 1 to 5. Moreover, only its lateral edges are cut which improves the guiding and couple-transmitting functions of the lug.

The notches 243, 244 comprise a first section 260, perpendicular to the lateral edge 26 substantially transverse to the movable flange, a base 262 having a part 263 perpendicular to section 260, and a part 264 sloping in relation to part 263, to permit rotation of the element 239. This dihedral shape of the base 262 allows the thickness of material to be increased between the base 262 and the central opening 45 of the movable plate. In addition, good guidance between the element 239 and the plates 138, 140 can be obtained. The lugs 241, 242 engage with a slight radial play in the notches 243, 244. In the rest position there is contact between section 260, (the application section) and the edge of the lug 241 or 242 as a result of the action of spring 65.

The torsion damping device of FIGS. 6 and 7 to 12 functions in a similar manner to the device in French patent application No. 2 566 497, and of course the circumferential development of section 48 is made at least equal, angularly, to the sum of the circumferential play JT, JR of the meshing means with play interposed between the hub flange and the hub.

It will be recalled that after reaching the critical speed, determined in particular by the return springs 65, each of the plates 138, 140 is displaced radially by the centrifugal force to which it is subjected, being guided during this first phase of radial displacement by pillars 44 with which it is engaged, along the straight sections 49 of the slots 43.

If at such a critical speed the set of teeth 39 of each of the plates 138, 140 is circularly facing the corresponding set of teeth 40 of hub 10, the plates 138, 140 then move into an operating position in which, at the end of its radial displacement, each plate is engaged by the said set of teeth 39 with the corresponding set of teeth 40 of hub 10. At this point each of the plates 138, 140 can pivot around the axis of the assembly in relation to the hub flange 12, the pillars 44 then running along the curved sections 48 of the slots 43. In the course of this rotation each of the plates interacts, by its application lugs 42, with the windows 34A of flange 12 in such a way that it then acts on the springs 33A to bring them into action. It will be noted that it is only during the first phase that the transmission element 239 intervenes, because once the plates 138, 140 are in the operating position, no rotational movement of the element 239 with respect to plates 138, 140 is produced.

Each of the movable plates entrains, as a result of its notch 243, 244, the lugs 241, 242 of the element 239, making it turn around the axis of the assembly. A good synchronization of the radial displacements of plates 138, 140 is obtained whatever the circumstances may be. In fact, even if one of the springs 65 is broken, or if one of the movable plates seizes on the transmission element 239, the other plate causes a rotation of the element 239 and thus automatically a radial displacement of the other movable plate in the opposite direction.

Below the critical speed, for example during slowing down, the torsion damper works in the following manner.

The hub flange 12 is displaced relative to hub 10, against the weak elastic means 18, the flanges 23 being fixed in rotation with the hub flange 12 by the elastic means 33A, 33B. During this phase the movable plates held in their standby position by the springs 65, have no action. After the play between the sets of teeth 15, 16 is taken up, the hub flange 12 becomes fixed in rotation with hub 10, and the flanges 23 become movable relative to flange 12 against the elastic means 33A, 33B. During this second phase, below the critical speed, the movable plates 138, 140 can move in the manner described above.

Figure 13:
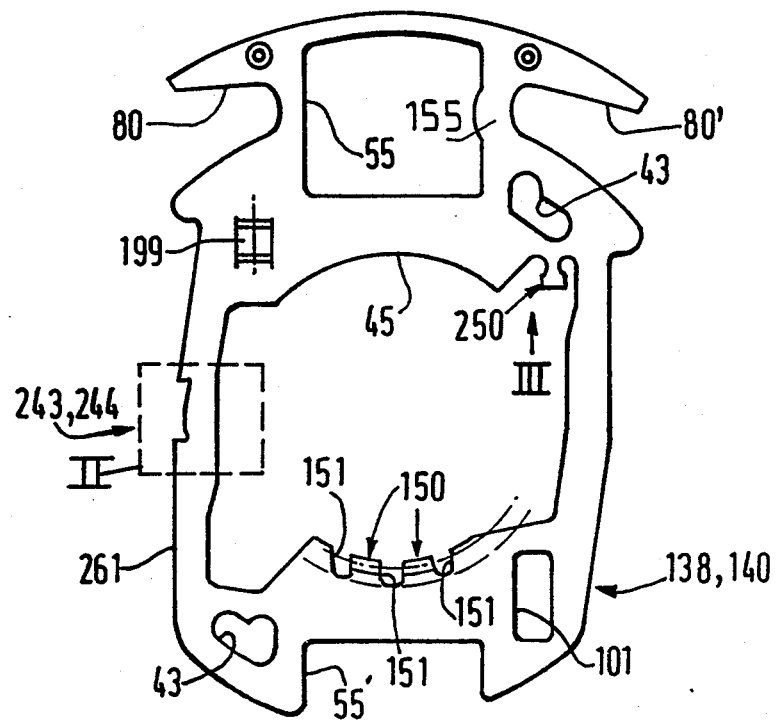
FIG. 13 is a similar view to FIG. 11 of another embodiment.
Figure 14:
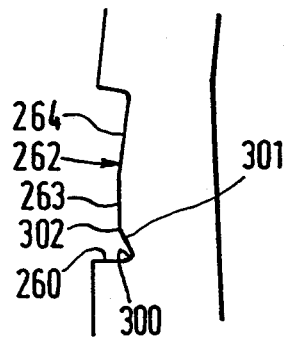
FIG. 14 is an enlarged view of the box II in FIG. 13.
Figure 17:
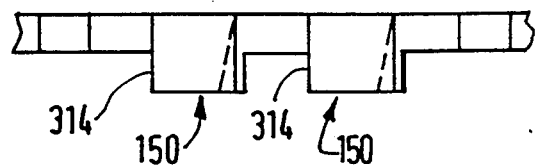
FIG. 17 is a partial view of the teeth of the flange along arrow IV in FIG. 13.
Figure 15:
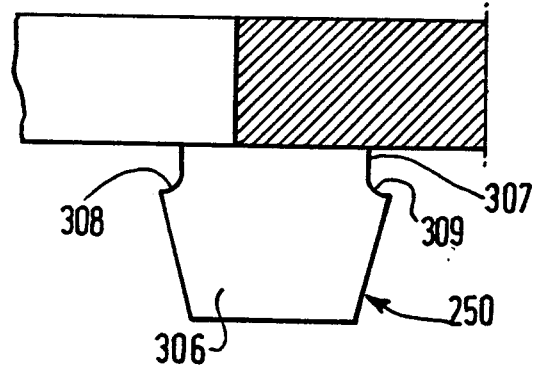
FIG. 15 is a partial view of a hooking lug along the arrow III in FIG. 13.
Figure 16:
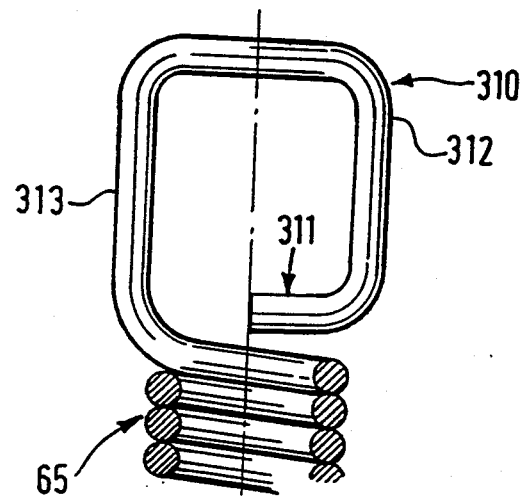
FIG. 16 is a partial view of the return spring.
Figure 19:
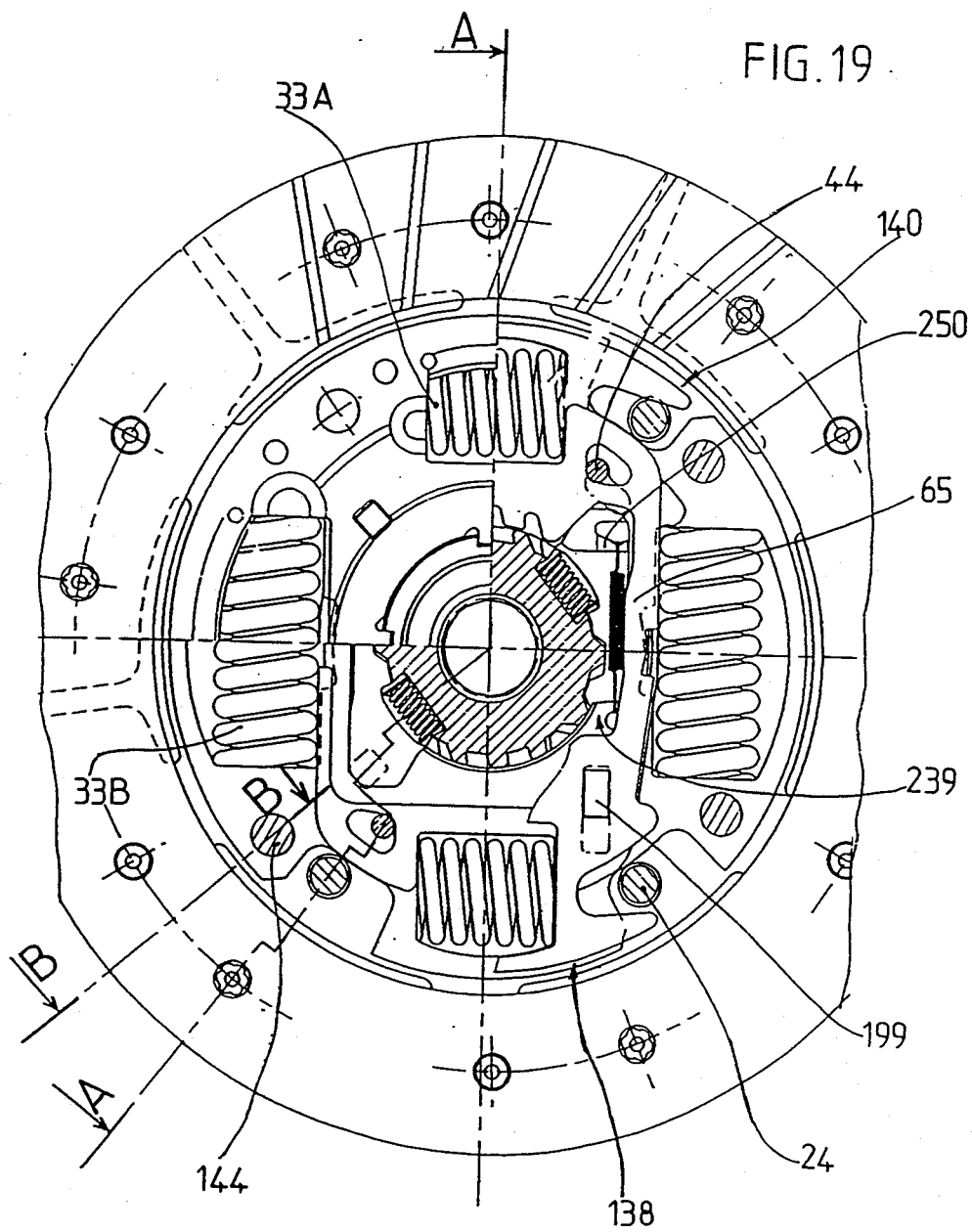
FIG. 19 is a similar view to FIG. 7 of another embodiment with a transmission element of FIG. 18.
Figure 22:
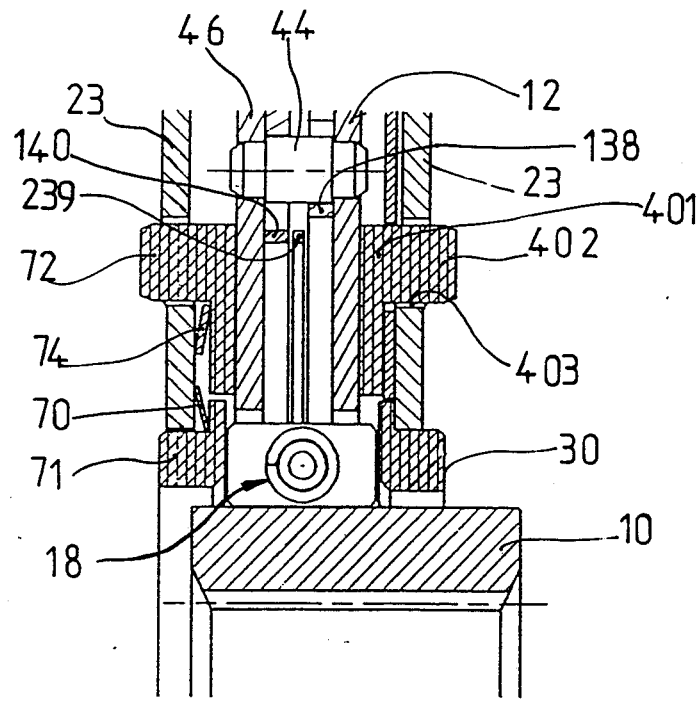
FIG. 22 is a partial enlarged view of the central part of FIG. 21.

According to another variant (FIG. 13), the base 262 of an opening 243, 244 is notched in the zone where it meets the application section 260. More precisely, the edge 263 is notched in the zone where it meets the application section 260. This notch (FIG. 11) comprises a rounded section 300 joining, on the one hand, the application section 260 and, on the other hand, an inclined section 301 the end of which 302 rejoins the edge 263. The vertical distance between this end 302 and the application section 260 is less than the height of the entrainment returns or lugs 241, 242.

Thus the clearances between the lugs 241, 242, which are not weakened, and the edge 263 are reduced to the minimum because of this removal. The guiding bent-out lug 199 extends transversely, that is to say perpendicularly to the horizontal axis of symmetry of FIG. 13.

Consequently the element 239 possesses a cut out zone 303 shaped for the passage of bent-out lug 199. Here two diametrically opposite zones 303 are provided, namely one for each movable plate 138, 140.

This zone is bordered by two edges 304, 305 perpendicular to one another, edge 305 being transverse and parallel to the vertical side of the bent-out lug, whilst edge 304 is parallel to the base of the lug.

This arrangement allows a saving in material. The plates 138, 140 and the transmission element 239 are made from metallic sheets by cutting and folding; the bent-out lug 199 being made by cutting the lateral edges and shaping, and being continuous.

The hooking-on lug 250 has a V-shaped end 306. This lug 250 is formed from a right angle return with a central part 307 connecting the end 306 to the main part of the movable plate 138, 140.

The end of the V is truncated and the rear faces form shoulders 308, 309 delimited by the central part 307. The axial length of the part 307 is at least equal to the thickness of the end 310 of the return spring 65. The shoulders 308, 309 are rounded.

The end 310 forms an open strand 311 in the shape of a rectangle taller than the thickness of the lug 250. This strand 311 prolongs the turns of the spring 65 made from a wire with a round cross-section.

The internal width of the rectangle made by the strand 311 is less than the maximal width of the V, so that on axial engagement on the lug 250, the lateral edges 312, 313 of the strand rectangle move apart then reclose after passing over the V and consequently the end 306. Automatic mounting of the assembly is simplified by this arrangement.

The movable plate possesses several teeth 150 framed by gaps 151. Equally the hub 10 presents axial grooves to receive these teeth 150. Each tooth 150 has an axial return 314 suitable to engage in the complementary grooves of the hub.

It will be appreciated that the capacity of the movable plates to transmit a couple made in the central part of the movable plate.

In a variant (FIG. 24 and 26) the lug 250 extends axially, perpendicular to the lateral face 261 and has a raised edge 350 higher than the plane of the movable plate 138, 140 and connected by a rounded zone 351 to a zone of origin 352 in the plane of the plate. The lug 250 is delimited by the central opening 45 and a cut away opening 353 situated below the slot 43. This lug 250 presents, at the edge of the opening 353, a recess 355 widened to receive the rounded end 354, in the shape of a crook, of the spring 65.

The end 354 thus forms a hook with a terminal curved engagement portion 356, joining a circular portion 357, extending over more than 180°, itself joining a vertical portion 358. A narrowing of width D (FIG. 25) is thus created. It will be noted that the width D is less than the thickness of the lug, and that mounting of the spring 65 is made by clipping while pulling transversely.

In fact it suffices to introduce the end 354 into the opening 353 until there is contact of the portion 356 with the lug 250 and to pull. In this operation the end 354 opens (the width D increasing) then recloses once the lug 250 has passed through the constriction. After mounting, the end 354 remains hooked and thus gripped on the lug 250, the constriction having a width greater than the width D. Preferably the edges of the lug are chamfered. Opening of the end 354 is facilitated by the portion 356 which constitutes an assembling chamfer, whilst the recess 355 positions the spring 65.

It will be noted that the mounting can be made on either side of the movable flange and that the lug 250 is strong and is not at risk of being damaged by bending at right angles; only the end of the edge 350 is cut.

Figure 23:
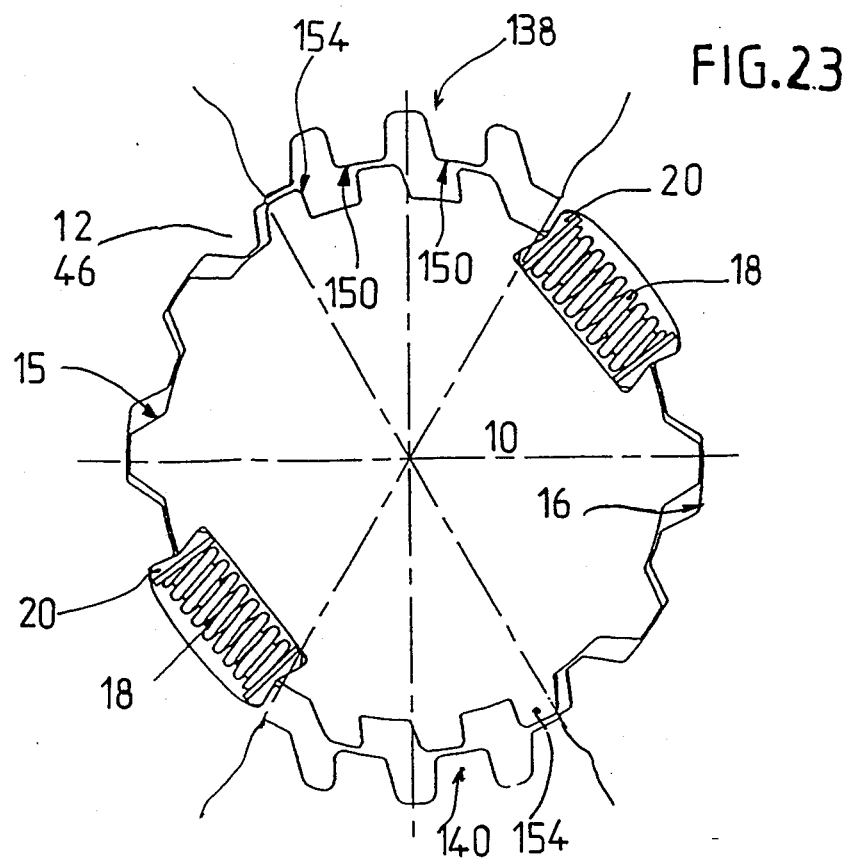
FIG. 23 is a simplified view of the sets of teeth of the various pieces.

The rotatable element 239 is identical to that in FIG. 18 whilst the two teeth 150 are deprived of axial returns. FIG. 23 shows the sloping shape of the teeth 150 as well as those 154 of hub 10.

Figure 2:
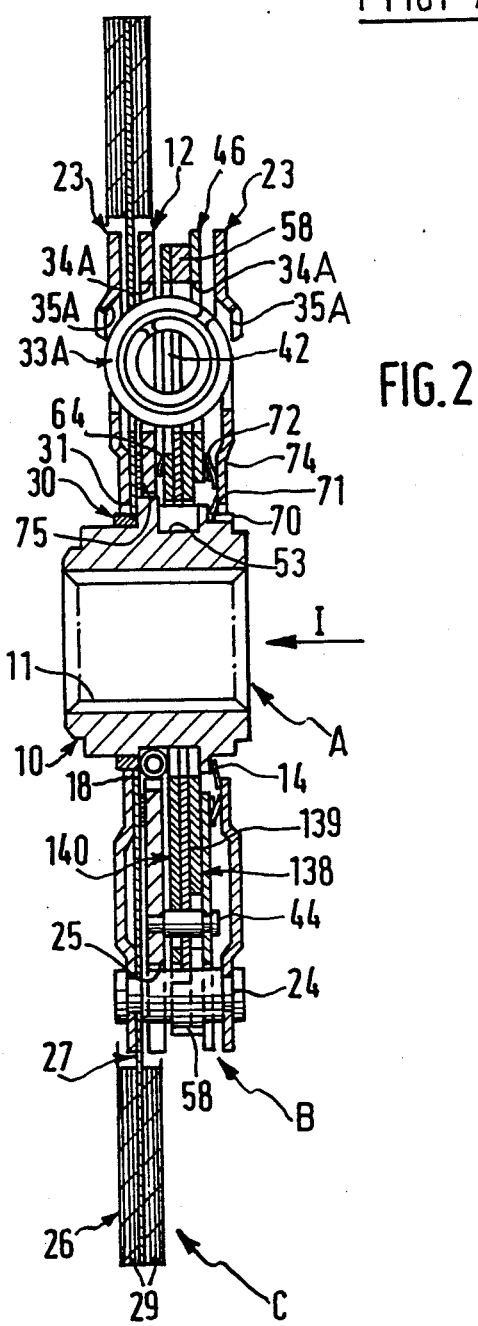
FIG. 2 is a view in axial section along the line II—II of the device shown in FIG. 1.

In a variant (FIG. 19 to 26) the flange 12 and the counter-flange 46 are identical, to give a better distribution of forces, and are joined and fixed by four struts 144 disposed substantially on the same circumference as the struts 240. The two struts 44 thus act solely for guidance whilst the spring 64 of FIG. 2 is omitted.

The friction washers 71, 72 are of synthetic material. It will be noted that washer 71 is identical to bearing block 30 whilst washer 72 is identical to a washer 401 adjacent to the other guiding washer and has rectangular pegs 402 each engaged in an opening 403 of the guiding washer 23. This arrangement stems from the nature of the guiding washers. The washers 70, 74 are Belleville washers In a variant (FIG. 27) a friction washer 400 is freely mounted on the hub and meshes with the hub with a play less than the play provided between the hub and the hub flange. More precisely, in FIG. 27 the washer according to the invention is shown as 400.

This washer 400 (FIG. 28) possesses teeth 404 engaged in the set of teeth of hub 10. As can be seen in this Figure, the total play 2J2 which exists between a tooth 404 of this washer and two consecutive teeth 15 of hub 10 is less than the play 2J1 which exists between the said teeth 15 and the corresponding tooth 16 of flange 12.

This washer thus adds to the friction when the movable plates are in the operating position. By a washer mounted freely on the hub is meant here a washer which has no connection with the elastic means of the torsion damper. Two consecutive teeth 404 delimit a notch 405.

The present invention is not limited to the embodiments described but encompasses all variations and embodiments.

In particular, anti-seizing facings can be provided between the plates and the transmission element. These facings can be chromium based. Similarly, the hub can be made by sintering, which allows several teeth to be provided on each flange and on the hub.

Instead of entrainment means in the form of lugs extending into notches, pegs engaged in openings shaped for this purpose can be provided. The lugs (or right angled returns) can be integral with the movable plates and engaged in openings in the transmission element.

Figure 6:
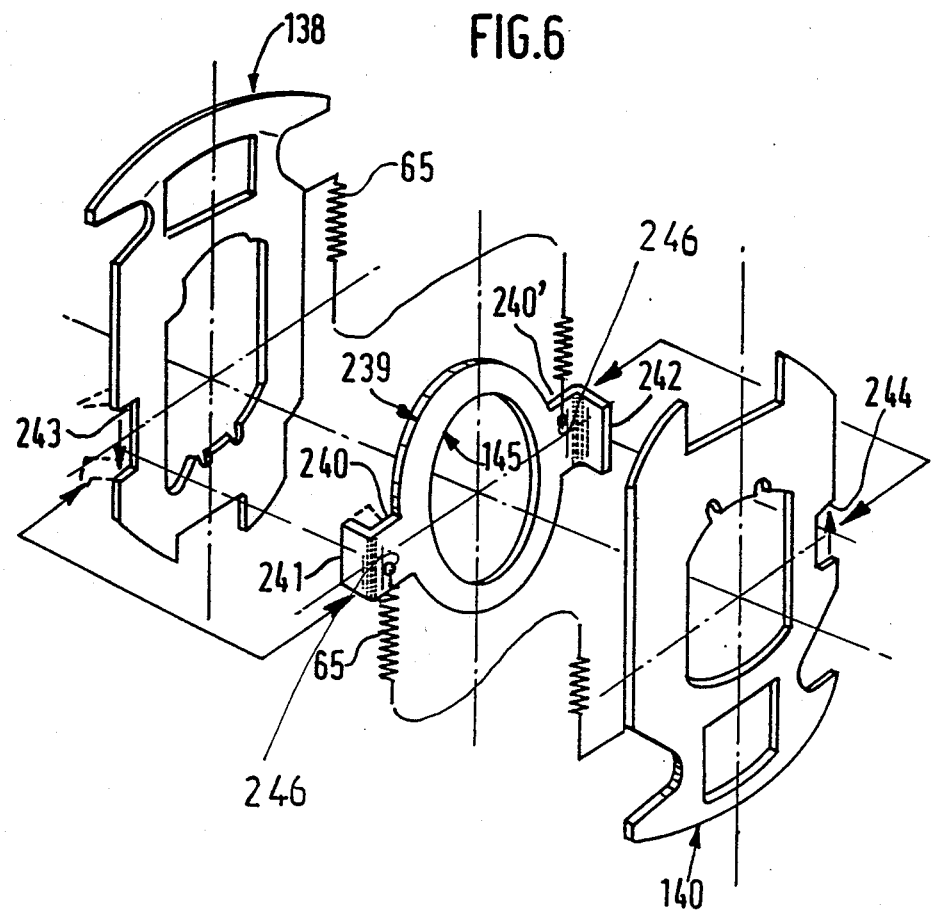
FIG. 6 is a perspective view of two movable plates and the transmission element according to the invention.
Figure 7:
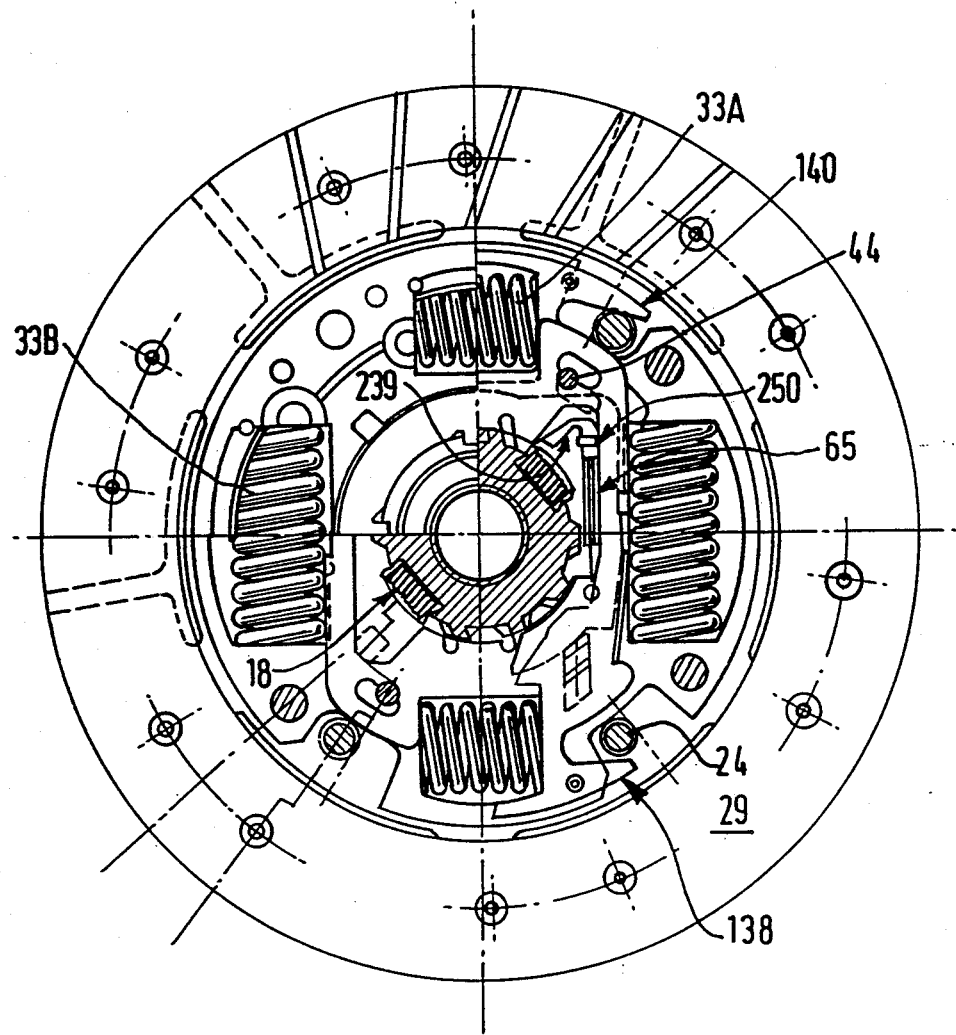
FIG. 7 shows a view in front elevation, partially cut away, of an embodiment of the device according to the present invention.
Figure 11:
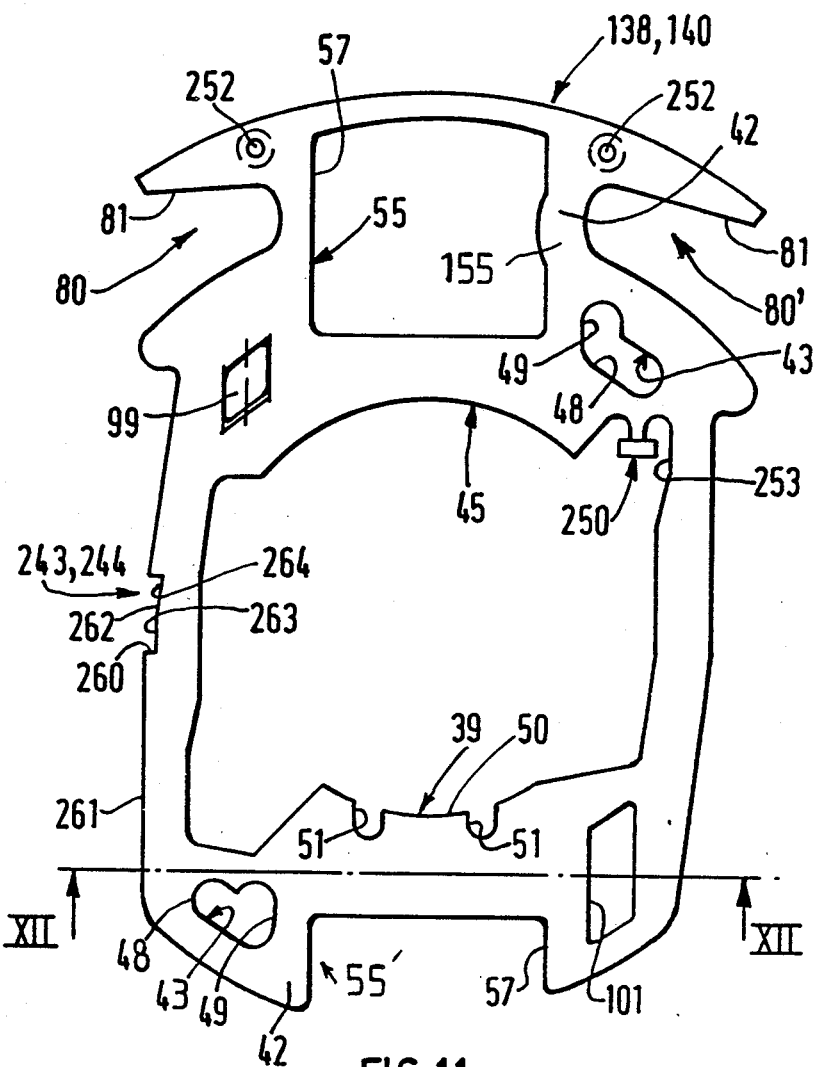
FIG. 11 is a front view of one of the movable plates of FIG. 7.
Figure 12:
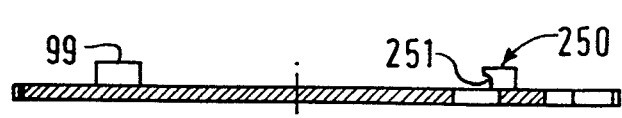
FIG. 12 is a view in section along the line XII—XII of FIG. 11.

To increase the contact zone between the lugs 241, 242 and the notches 243, 244 each plate and each lug can be folded, as shown by dotted lines in FIG. 6.

What is claimed is:

1. A torsion damping device, comprising a hub, at least one transverse hub flange encircling the hub and being connected therewith by meshing means with play; first circumferentially-acting elastic means disposed between the hub flange and the hub, at least one flange coupled to the hub flange by second circumferentially-acting elastic means, said at least one flange encircling the hub but not being connected to it; an interposing element comprising two movable plates, responsive to centrifugal force, mounted for movement between a standby position in which the plates are inactive and, above a set speed of rotation, an operating position, in which they intervene between the hub and the hub flange for at least one direction of rotation, by driving in the direction of rotation at least a part of the second circumferentially-acting elastic means other than those which normally act between them; and return means operable to urge said movable plates towards their standby position; and wherein said movable plates are connected to one another by at least one transmission element, said transmission element being mounted for rotation relative to the plates such that a radial displacement of one of the movable plates causes rotation of the transmission element and a corresponding radial displacement in the opposite direction of the other movable plate.

2. A device according to claim 1, wherein said transmission element is radially fixed and is rotatable relative to the movable plates around the axis of the assembly.

3. A device according to claim 2, wherein the transmission element comprises axial returns extending in opposite directions, said returns being operable to locate and centre the transmission element relative to teeth formed on said meshing means with play.

4. A device according to claim 1, wherein entrainment means are provided between the transmission element and each of the movable plates.

5. A device according to claim 4, wherein said entrainment means are disposed symmetrically from one movable plate to the other.

6. A device according to claim 5, wherein said entrainment means comprise a right angle return carried by an arm of the transmission element and a notch in the side edge of the movable plate, said return extending into and cooperating with the notch.

7. A device according to claim 6, wherein said notch has an application section for the right angle return and a base, and said base is notched in the zone where it meets the application section.

8. A device according to claim 1, wherein each movable plate has a lug onto which the return means is hooked.

9. A device according to claim 8, wherein the lug extends axially and has a raised edge and a widened recess for hooking onto a spring comprising said return means.

10. A device according to claim 1 wherein each movable plate has slots operable to engage pillars connecting the hub flange to a counter flange, a bent-out lug adapted to engage in a window of the other movable plate to guide this radially, and a set of teeth to engage with a corresponding set of teeth provided on the hub, and wherein the bent-out lug is disposed on the radial portion of the movable plate opposite that presenting said set of teeth.

11. A device according to claim 10, wherein the bent-out lug has a convex shape with two lateral cut edges.

12. A device according to claim 10, wherein two flanges are situated axially on either side of the hub flange and each movable plate comprises, on the side radially opposite said set of teeth, an opening in the form of a window adjacent a notch for receiving pillars joining said two flanges together, and wherein the portion of the radial edge of the window facing the base of the notch is thickened.

13. A device according to claim 1, wherein the return means comprise coil springs disposed parallel to the diametric plane of the assembly and each coil spring connects one attachment lug of one of the movable plates to an attachment opening provided in said transmission element.

14. A device according to claim 13, wherein the lug extends axially and has a raised edge and a widened recess for hooking onto said coil spring.

* * * * *